July 18, 1950     W. S. ALLEN     2,515,435
APPARATUS FOR THE MANUFACTURE OF SULFURIC ACID
Filed Oct. 30, 1946
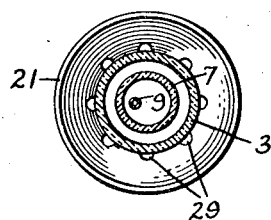
FIG. 2.
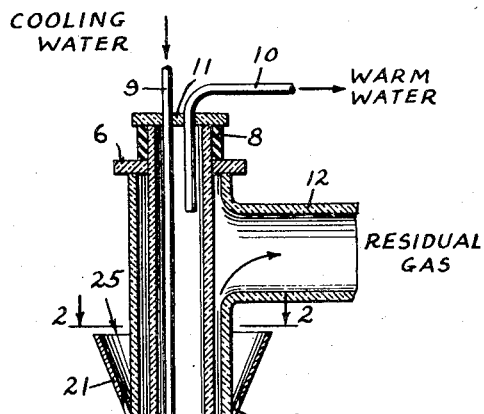
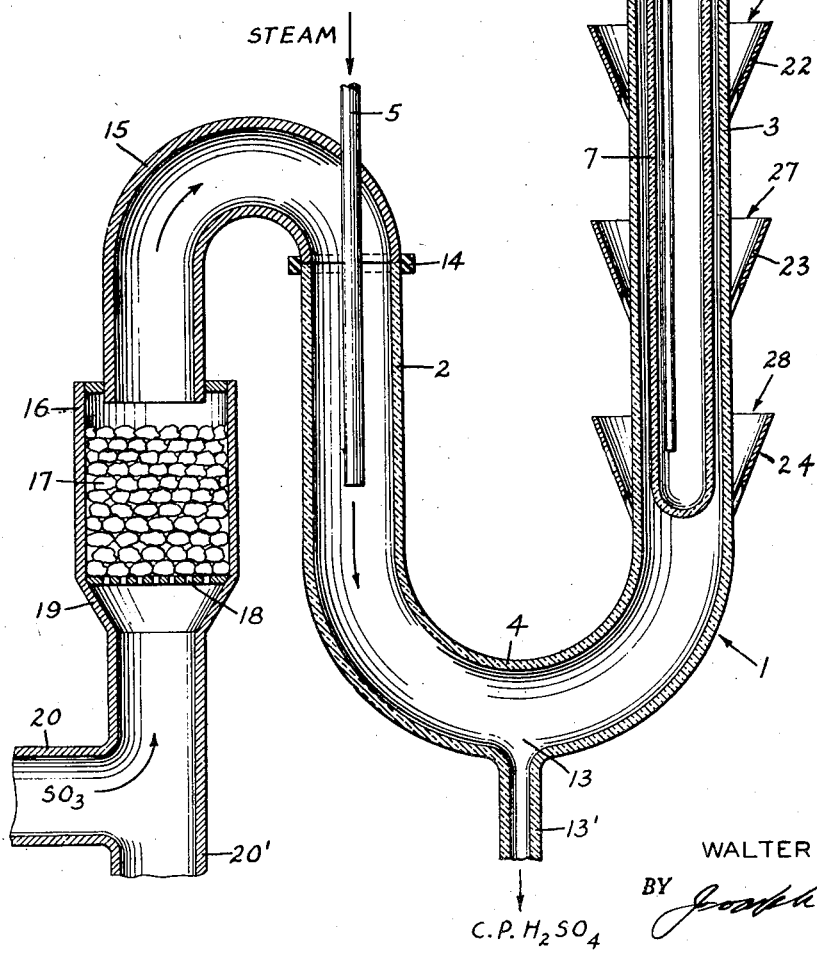
INVENTOR.
WALTER S. ALLEN
ATTORNEY.

Patented July 18, 1950

2,515,435

UNITED STATES PATENT OFFICE 2,515,435

APPARATUS FOR THE MANUFACTURE OF SULFURIC ACID

Walter S. Allen, Flushing, N. Y., assignor to Allied Chemical & Dye Corporation, a corporation of New York Application October 30, 1946, Serial No. 706,755

4 Claims. (Cl. 23—261)

This invention relates to processes for making so-called chemically pure sulfuric acid, and also to apparatus suitable for use in the manufacture of such acid.

One of the common methods for making C. P. (chemically pure) sulfuric acid is by absorption of the sulfur trioxide exit gas of a catalytic oxidation contact process in water or dilute sulfuric acid under suitable conditions to produce C. P. sulfuric acid. Also, it is known to mix contact process sulfur trioxide with steam to form sulfuric acid vapor which is then condensed to form C. P. sulfuric acid.

While prior methods for making C. P. sulfuric acid result in production of acid of relatively acceptable quality, trade specification requirements are constantly becoming more rigid. Further, the use of "spent oxide" and flotation concentrate pyrites as sulfur-bearing raw materials in the contact process gives sulfur dioxide gases emanating from the burners carrying small amounts of nitrogen compounds as impurities which subsequently appear in the sulfur trioxide gas leaving the converter system. If converter exit gases of this type are used as such for manufacture of C. P. acid, the nitrogen impurities contaminate the acid product.

One object of my invention is accordingly to afford improved inexpensive processes and apparatus for making sulfuric acid of high purity. Another object is to provide process features which eliminate the above-noted nitrogen compound contaminating conditions.

Other objects and advantages will appear as the description of my invention proceeds.

In accordance with a preferred embodiment of my invention, I have found that high quality sulfuric acid may be made by procedure comprising introducing steam and gaseous substantially pure sulfur trioxide containing substantially no nitrogen compounds into the upper end of a relatively vertically disposed reaction zone and passing said steam and sulfur trioxide downwardly thru said reaction zone whereby sulfuric acid vapor is formed, passing the resulting sulfuric acid vapor upwardly thru a substantially vertically disposed condensing zone, cooling said vapor in said condensing zone to liquefy sulfuric acid, said zones, beyond the point of initiation of the $SO_3$-$H_2O$ reaction, being formed by an integrally fabricated, unbroken, continuous wall of acid-resistant material, collecting sulfuric acid in a sump section formed by said wall and disposed at the bottoms of and lying intermediate said zones, and withdrawing chemically pure sulfuric acid from said sump section.

In the accompanying drawing, Fig. 1 is a vertical sectional view showing one form of apparatus particularly adapted for use in the practice of my process, and Fig. 2 is a horizontal sectional view of a detail of this apparatus taken on line 2—2 of Fig. 1.

As shown in Fig. 1 of the drawing, I designates a U-shaped tube formed by an integrally fabricated, unbroken, continuous wall of acid-resistant material such as fused and molded silica and having a short arm 2, a long arm 3, and a U-bend 4 therebetween. Mounted in short arm 2 by any suitable means is a steam inlet tube 5 having an opening within and somewhat below the top of short arm 2. Suspended thru a plate 6 at the top of long arm 3 is an internal bayonet-type cooler comprising an elongated tube 7 of acid-resistant material, preferably silica, supported on plate 6 by a thickness of packing 8 placed about the upper portion of tube 7 extending above plate 6. Tube 7 has mounted therein cooling water inlet tube 9 and water outlet tube 10, the two latter tubes being inserted into tube 7 thru a collar 11 fastened to the top of tube 7 by any suitable means. In the upper portion of long arm 3 near its top is a residual gas outlet 12 forming an integral part of U-shaped tube I. The bottom of the U-bend 4 forms a sump section 13 terminating at its lowermost portion in a liquid outlet 13'.

Attached to short arm 2 of U-shaped tube I by means of a single packed joint 14 is an inverted U-shaped gas inlet pipe 15 made of suitable material such as silica. The other end of gas inlet member 15 extends a short distance into the top of a gas filter receptacle 16 containing packing material 17, such as pebbles, said packing being supported by a perforated plate 18 at the bottom of receptacle 16. Receptacle 16 is directly connected by means of inclined members 19 to a pipe 20 connected preferably to an oleum still not shown. Vertical pipe section 20' may be connected to a suitable liquid seal not shown.

Secured to the outer walls of long condensing arm 3 by any suitable means are metallic conically shaped members 21, 22, 23 and 24. Fig. 2 more clearly shows the structure of each of these members as represented by member 21 having a number of approximately equally spaced small holes 29 about its lower inner circumference as water outlets. These members serve to direct auxiliary cooling water, if necessary, in streams down the outer walls of long condensing arm 7 in a manner to be hereafter described.

My device in its preferred embodiment comprises a U-shaped tube having a short arm 2 forming a reaction zone and a long arm 3 affording a condensing zone. A longer arm is provided for the condensing zone as compared to the arm housing the reaction zone in order to afford sufficient cooling surface, as provided by the outer wall of a long bayonet-type cooling tube 7 and the inner wall of long arm 3, to promote a gradual rather than a sudden condensation of the sulfuric acid vapor for reasons later to be noted. However, if desired, both arms may be constructed of equal length if sufficient surface is provided in the condensing arm to result in the above-noted gradual cooling effect.

U-shaped tube 1 and the bayonet-type cooling tube 7 have been specified as constructed of an acid-resistant material such as fused and molded silica. It is to be further noted in this connection that all other parts of my apparatus presenting surfaces in contact with sulfuric acid vapor or liquid sulfuric acid are also fabricated preferably of the same acid-resistant material.

The construction of U-shaped tube 1 in the form of an integrally fabricated, unbroken, continuous wall of acid-resistant material having only one packed joint is an important feature of my invention. As the result of such structure, non-volatile contaminating material from seepage thru the joint packing, usually made of asbestos and sodium silicate, is kept at a minimum, especially since the arrangement of structural elements is such that the $SO_3$-$H_2O$ reaction is initiated within the U-shaped tube 1 at a point beyond the packed joint 14, i. e. in the vicinity of the inner end of steam inlet pipe 5.

As described in greater detail in relation to the above apparatus, my process is carried out in the following manner: Sulfur trioxide gas substantially free from contamination by nitrogen compounds is first passed at elevated temperature thru piping 20 into the lower portion of receptacle 16, thence thru perforated plate 18 and upwardly into and thru the mass of pebble packing 17. Passage of the sulfur trioxide gas thru the pebble packing eliminates suspended impurities and droplets of moisture or acid mist carried by the sulfur trioxide gas. The hot purified sulfur trioxide gas continues upwardly thru inverted U-tube 15, around the bend thereof, and is then conducted downwardly into a reaction zone represented by short arm 2 of U-shaped tube 1. Steam is introduced into this zone thru steam inlet tube 5 and is mixed with the sulfur trioxide gas to form sulfuric acid vapor. The resulting sulfuric acid vapor is then conducted thru U-bend 4 into the condensing zone in long arm 3 where the sulfuric acid vapor comes into contact with the cool inner wall of long arm 3 and with the outer wall of the bayonet-type cooling tube 7, kept cool by the circulation of water therethru by means of water inlet and outlet tubes 9 and 10, respectively. Condensation of sulfuric acid vapor then takes place and the condensed droplets of sulfuric acid run down the outer wall of the bayonet cooling tube 7 and the inner wall of long arm 3 and are discharged thru the sump section 13 and liquid outlet 13' in the lowermost portion of U-bend 4. The discharged C. P. sulfuric acid is then passed to an acid seal, a cooler, and finally to storage, all not shown. Any residual uncondensed gas passes thru outlet 12 in the upper portion of long arm 3, and is conducted to any suitable scrubber such as a coke box, not shown.

As above indicated, when sulfur dioxide gas is prepared from the present widely used finely divided sulfide ores, this gas contains small amounts of nitrogen compounds which appear in the form of traces of nitric acid or nitrosyl-sulfuric acid in the sulfur trioxide leaving the converters of the well-known contact process, and carry on thru to contaminate the sulfuric acid product. Under these circumstances, in the manufacture of C. P. sulfuric acid it is thus necessary to treat contact sulfur trioxide gas or the finished sulfuric acid product with a regulated amount of hydrogen sulfide to destroy these nitrogen compounds, and the sulfur dioxide formed from this reaction is difficult to remove.

In the practice of the present improvements, the foregoing difficulties are overcome by using, as a source of sulfur trioxide, a sulfur trioxide gas formed by distillation of oleum. According to the invention, it has been found that when oleum containing nitrogen compound contaminants is distilled, such contaminants remain as still bottoms and there is formed a sulfur trioxide gas which contains substantially no deleterious nitrogen compounds. Thus, an important feature of my process is provision of a sulfur trioxide gas substantially free of contaminating nitrogen compounds, and I find that such a gas may be obtained readily by the distillation of commercial oleum which may be made by the ordinary known processes and which, particularly when produced from $SO_2$ gases formed by combustion of sulfides, is usually contaminated with nitrogen compounds.

The oleum employed may be of the customary commercial strengths, e. g. 20–65%. Preferably, distillation of oleum is effected by external heating to temperatures sufficiently high to vaporize $SO_3$ but not high enough to boil off any sulfuric acid vapor. By such procedure, there is formed an $SO_3$ gas which is not only substantially free from contaminating nitrogen compounds but is also substantially pure in other respects and for practical purposes may be considered as 100% $SO_3$. However, with respect to the sulfur trioxide gas used in carrying out the instant process, apart from substantial absence of contaminating nitrogen compounds, it is not wholly essential that the sulfur trioxide gas be otherwise substantially pure. Thus, it is possible to employ an $SO_3$ gas which may contain some appreciable quantities of inert diluents, such as air, although in reasonably good practice of the invention, it is preferred to use a sulfur trioxide gas of strength not less than about 90% $SO_3$.

The particular sulfur trioxide gas employed is conducted at temperature of about 200° F. into short arm 2 into which steam is simultaneously charged in regulated proportions. Reaction of $SO_3$ and steam to form sulfuric acid vapor takes place substantially instantaneously at the point of introduction of steam into the sulfur trioxide gas and substantial quantities of heat are generated, such heat comprising heat of the $SO_3$-$H_2O$ reaction and heat of dilution of sulfuric acid. If union of sulfur trioxide and steam takes place at a temperature below the dew point of the resulting sulfuric acid vapor, sulfuric acid mist forms. Particularly in the presence of appreciable quantities of inert carrying gas, this mist cannot be condensed in a simple condensing system but is carried along thru the condenser in suspension in the gas stream causing an economic loss and a nuisance. When the ordinary relatively dilute $SO_3$ exit gas of a catalytic converter system is employed in the reaction with steam, it may be necessary to add external heat to the heat of reaction produced by union of $SO_3$ and steam to raise this large body of gas to a temperature above the dew point of the resulting sulfuric acid vapor so as to prevent mist formation. However, the process of the present invention is such that formation of sulfuric acid mist is automatically avoided by employing a gas which has an $SO_3$ concentration preferably not less than 90%, and by regulating the quantity of steam introduced thru inlet 5 so that the sulfuric acid formed and eventually collected in sump 13 has an $H_2SO_4$ strength of not less than 80%. I find that by so controlling the $SO_3$ strength of the incoming gas and limiting the quantity of steam utilized as indicated, there is always generated in the reaction zone in short arm 2 adequate quantities of heat to maintain temperatures well above the dew point of the sulfuric acid being produced, thus avoiding the formation of sulfuric acid mist.

In the practice of better embodiments of the invention, it is preferred to operate in such a way that the liquid sulfuric acid collecting in sump 13 and draining out of the apparatus thru outlet 13' has a temperature of not less than 300° F. At this high temperature of acid discharge, any sulfur dioxide gas incidentally and unavoidably present in the system is vaporized out of the liquid sulfuric acid and is eventually discharged from the apparatus thru outlet pipe 12. This condition results in production of C. P. sulfuric acid of very low $SO_2$ content. In order to maintain the indicated 300° F. temperature in the liquid acid discharged thru outlet 13', I find that it is preferable to so restrict the quantity of steam introduced thru inlet 5 as to maintain temperatures in the vicinity of the outlet end of pipe 5 not less than about 400° F. In turn, such temperatures of 400° F. and higher may be created readily by controlling introduction of steam so that the resulting liquid sulfuric acid condensate has an $H_2SO_4$ strength of at least 80%, that is by adjusting the quantity of steam introduced so that the strength of the liquid product of the process is about 80% $H_2SO_4$ and upwards, temperatures of 400° F. or more are automatically maintained in the $SO_3$-$H_2O$ reaction zone in short arm 2.

The sulfuric acid vapor formed in short arm 2 is conducted around U-bend 4 and thence upwardly into long arm 3 of U-shaped tube 1, where it is condensed under conditions avoiding sudden cooling or chilling of the vapor so as to again restrain formation of sulfuric acid mist. To carry out this purpose, condensing arm 3 and the bayonet-type cooling tube 7 are each preferably constructed so as to provide a condensing zone about three times the length of steam inlet arm 2. This feature of construction provides substantial cooling surface to bring about a gradual cooling of the sulfuric acid vapor and its condensation in droplets on the inner wall of long arm 3 and the outer wall of bayonet cooler tube 7.

If it is desired to obtain a greater cooling effect than that produced by bayonet cooler tube 7 alone, especially on warm days, water may be poured into the uppermost conically shaped member 21 as shown by arrow 25. The water drains out of the bottom of member 21 thru holes 29 in the lower portion thereof and continues to flow down long arm 3 and into the next lowest conical member 22. In this manner, a stream of water is kept continually flowing about the outer wall of a considerable portion of the length of long arm 3 and finally is conducted to a sewer outlet (not shown) after its passage thru the holes 29 in the lowest conical member 24. A larger quantity of water may be furnished for this purpose by also introducing water directly into the top of conical members 22, 23 and 24, as shown by arrows 26, 27 and 28, respectively.

My U-shaped tube may also be employed with equal facility as a condenser in a process wherein commercial sulfuric acid is distilled over to make sulfuric acid of C. P. quality. Further, it may be utilized as a simple condenser for other acids, e. g. nitric or hydrochloric, to obtain a chemically pure product. For each of these purposes, no steam inlet means is required in the short arm 2 of U-shaped tube 1.

By the practice of my process and employment of my apparatus, C. P. sulfuric acid of at least 80% and anywhere in the range of 80–100% strength and of high purity may be recovered. For example, using as a source of $SO_3$ a commercial oleum containing about 0.0001% by weight of nitrogen impurities as $HNO_3$, by practice of the process in the apparatus described, it is possible to make a 95–100% sulfuric acid product containing less than 0.00001% Fe, 0.0003% $SO_2$, 0.0001% non-volatile matter, and 0.00002% nitrogen impurities as $HNO_3$. Thus, contamination by nitrogen compounds, sulfur dioxide, and non-volatile material from seepage thru packings of joints in condenser equipment is minimized. Further, by reason of use of strong $SO_3$ gas and other features of the invention, practically all the constituents present are condensed and practice shows that, when using 100% $SO_3$ gas, the condenser tail gas losses amount to less than 0.25% by weight of total production. Further, gas pressures within the apparatus are minimized, and no leakage problems are presented.

If desired, a section in the condensing arm 3 below the cooler 7 and a portion of the lower annulus between cooler 7 and the adjacent inner wall of arm 3 may be provided with packing material, e. g. suitable pebbles or rings. When so arranged, this feature of the invention may be utilized to produce C. P. oleum of e. g. 30% strength.

Certain process aspects of the disclosure of this application are included in the claimed subject matter of my copending application Serial No. 794,034, filed December 26, 1947.

I claim:

1. Apparatus of the character described comprising a tube having a pair of vertically disposed arms and a connecting upwardly formed U-bend therebetween, means for introducing a reactant into the end of one of said arms, means for introducing a second reactant into said arm adjacent said end hereof, heat transfer means disposed internally in the other arm, means for supplying heat transfer medium to said transfer means, a reaction product outlet adjacent the top of said other arm, a reaction product outlet at the lower portion of said U-bend, said tube in its entirety being unitary, jointless, and formed by an integrally fabricated, unbroken, continuous wall of acid-resistant material.

2. Apparatus of the character described comprising a tube having a pair of vertically disposed arms and a connecting upwardly formed U-bend therebetween, means for introducing a reactant into the end of one of said arms, means for introducing a second reactant within said arm at a point substantially beyond said end of said arm, heat transfer means disposed internally in the other arm, means for supplying heat transfer medium to said transfer means, a reaction product outlet adjacent the top of said other arm, a reaction product outlet at the lower portion of said U-bend, said tube in its entirety being unitary, jointless, and formed by an integrally fabricated, unbroken, continuous wall of acid-resistant material.

3. Apparatus of the character described comprising a tube having a vertically disposed short arm forming an unobstructed reaction zone, a vertically disposed long arm forming an elongated heat transfer zone, and a connecting upwardly formed U-bend between said arms; means for introducing a reactant into the end of said short arm, means for introducing a second reactant within said short arm at a point substantially beyond said end of said short arm, heat transfer means disposed internally and substantially throughout the length of said long arm, means for supplying heat transfer medium to said transfer means, a reaction product outlet adjacent the top of said long arm, a reaction product outlet at the lower portion of said U-bend, said tube in its entirety being unitary, jointless, and formed by an integrally fabricated, unbroken, continuous wall of acid-resistant material.

4. Apparatus of the character described comprising a tube having a vertically disposed short arm forming an unobstructed reaction zone, a vertically disposed long arm forming an elongated cooling zone, and a connecting upwardly formed U-bend between said arms; means for introducing a reactant into the end of said short arm, said means comprising an inlet pipe attached at one end to the end of said short arm by means of a single joint, and a filter associated with the other end of said inlet pipe; means for introducing a second reactant within said short arm at a point substantially beyond said end of said short arm, a tubular silica heat transfer unit closed at its lower end and containing heat transfer medium inlet and outlet tubes at its top end, said unit being disposed within said long arm and being suspended thru a plate at the top of said long arm and extending downwardly substantially throughout the length of said long arm, means for flowing liquid cooling medium in film form downwardly over the outside of said long arm, a reaction product outlet adjacent the top of said long arm, a reaction product outlet at the lower portion of said U-bend, said tube in its entirety being unitary, jointless, and formed by an integrally fabricated, unbroken, continuous wall of fused and molded silica.

WALTER S. ALLEN.

REFERENCES CITED

The following references are of record in the file of this patent:

UNITED STATES PATENTS

| Number | Name | Date |
| --- | --- | --- |
| 158,924 | Faure | Jan. 19, 1875 |
| 270,763 | Dotterer | Jan. 16, 1883 |
| 767,335 | Evers | Aug. 9, 1904 |
| 1,865,607 | Allen | July 5, 1932 |
| 2,415,159 | Bradley | Feb. 4, 1947 |

OTHER REFERENCES

Ind. and Eng. Chem., Analytical ed., vol. 19, 1947, p. 144.